Aug. 5, 1930.    G. S. EXON    1,772,075
VEHICLE PROPELLED TURNTABLE
Filed April 16, 1928    2 Sheets-Sheet 1

INVENTOR.
Guy S. Exon
BY A. B. Bowman
ATTORNEY

Aug. 5, 1930.  G. S. EXON  1,772,075
VEHICLE PROPELLED TURNTABLE
Filed April 16, 1928   2 Sheets-Sheet 2
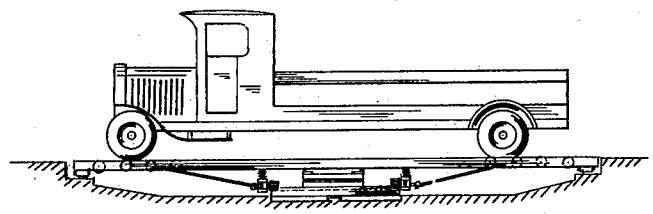
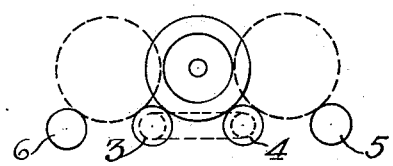
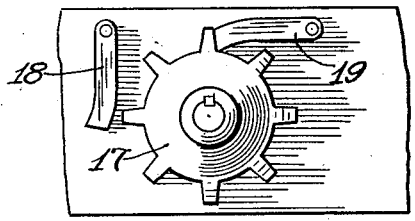
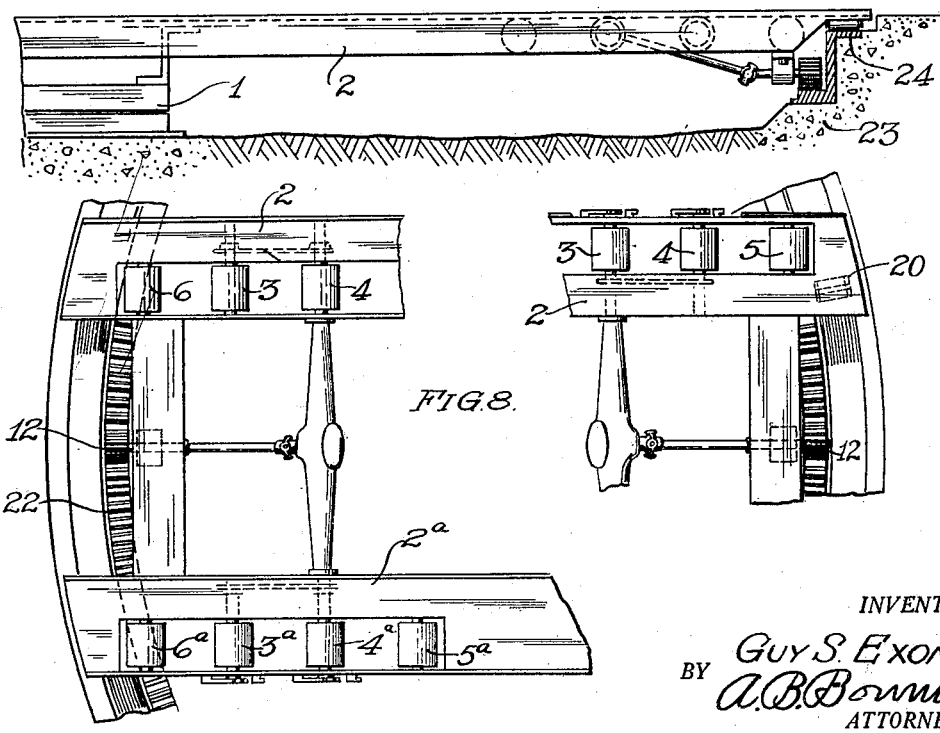
INVENTOR.
Guy S. Exon
BY A. B. Bowman
ATTORNEY.

Patented Aug. 5, 1930

1,772,075

UNITED STATES PATENT OFFICE

GUY S. EXON, OF NATIONAL CITY, CALIFORNIA

VEHICLE PROPELLED TURNTABLE

Application filed April 16, 1928. Serial No. 270,451.

My invention relates to turntables and more particularly to a vehicle propelled type of turntable and the objects of my invention are: first, to provide a turntable of this type which may be operated by the traction wheels of the vehicle supported on the turntable; second, to provide a turntable of this type having facility for enabling the power to be transmitted from the rear or traction wheels of the vehicle to a stationary circular rack; third, to provide a device of this class in which both wheels of the vehicle serve as propelling means for the turntable; fourth, to provide a device of this class in which the transmission means are to a certain extent flexible in order to allow for a slight tilting of the table when the vehicle is driven onto the runway; fifth, to provide a turntable of this type which may be readily reversed; sixth, to provide a turntable having revoluble traction drums which are adapted to be locked so as to prevent rotational movement of the turntable; seventh, to provide traction drums for transmitting power from the traction wheels of the vehicle to the operating mechanism of the turntable which supports the traction wheels in such a position that forward or backward movement of the vehicle will not readily take place during operation of the turntable; eighth, to provide a turntable of this type adapted to accommodate and to be operated by vehicles of various lengths, and ninth, to provide a novel form of vehicle turntable which is simple in structure, easy to assemble in position, rugged in construction, and which will not readily deteriorate or get out of order.

Figure 1:
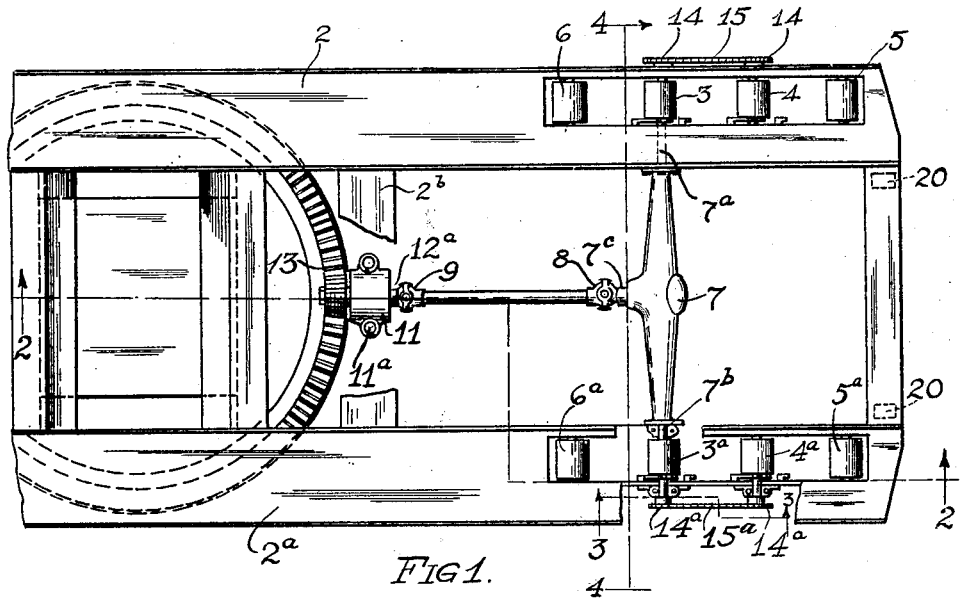
Figure 2:
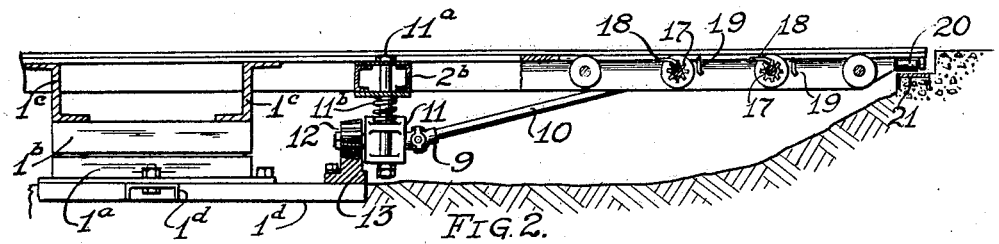
Figure 3:
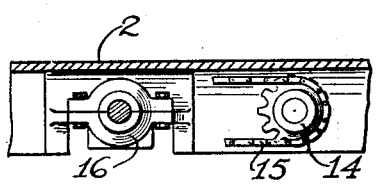
Figure 4:
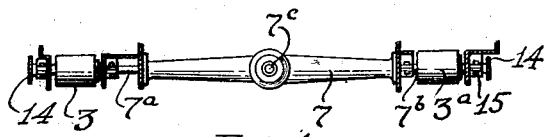

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a fragmentary plan view of my turntable in one form showing certain parts and portions broken away and in section in order to faciliate the illustration; Fig. 2 is a sectional view taken along the line 2—2 of Fig. 1 showing certain parts in elevation; Fig. 3 is a fragmentary sectional view taken along the line 3—3 of Fig. 1 showing one of the traction drum bearings and one of the sprockets and a portion of the chain connecting the two sprockets; Fig. 4 is a sectional view along the line 4—4 of Fig. 1; Fig. 5 is an elevational view of my turntable showing a truck mounted thereon in a position to operate the turntable; Fig. 6 is an enlarged diagrammatic view of the ratchet mechanism used in connection with the traction drums; Fig. 7 is a fragmentary elevational view of a modified form of my turntable; Fig. 8 is a fragmentary plan view thereof, and Fig. 9 is a diagrammatic view showing the position occupied by the traction wheels of trucks of different lengths when positioned on my turntable.

Similar characters of reference refer to similar parts and portions throughout the several views of the drawings.

The base 1, runway 2, traction drums 3 and 4, idler drums 5 and 6, transmission means 7, universal joints 8 and 9, shaft 10, pinion shaft bearing 11, pinion 12, ring-gear 13, sprocket 14, chain 15, drum bearing 16, ratchet 17, pawls 18 and 19, and rollers 20 constitute the principal parts and portions of my turntable.

The base member 1 consists of a lower stationary portion $1^a$ and an upper revoluble portion $1^b$. The portion $1^b$ is preferably supported on $1^a$ by means of a roller or ball-bearing, the details of which are not shown in the drawings, the bearing being preferably of any suitable conventional type. To the upper base portion $1^b$ I secure a pair of transversely positioned supporting members $1^c$, preferably of Z-shape, adapted to extend to either side of the base member, the outer ends of which are adapted to support the runway members 2 and $2^a$. The latter are built up preferably of channel iron and are of sufficient length to support large trucks.

The outer ends of the runways 2 and $2^a$ are provided preferably with four spaced apart drums 3, 4, 5 and 6 and $3^a$, $4^a$, $5^a$ and $6^a$, respectively. The drums 3 and 3ᵃ are mounted on shafts 7ᵃ and 7ᵇ which are accommodated in a housing 7. The housing 7 encloses the shafts 7ᵃ and 7ᵇ and ring-gear and pinion means connected therewith similar to the conventional automobile rear axle driving mechanism adapted to transmit power from the drums 3 and 3ᵃ to the shaft 10. The housing 7 is preferably supported at its outer end rigidly to the sides of the runways 2 and 2ᵃ providing for lateral bracing thereof. The driving pinion shaft 7ᶜ is connected to the one end of shaft 10 through the universal joint 8. The shaft 12ᵃ, carrying the driving pinion 12 is rotatably supported in the bearing 11, and is connected by means of the universal joint 9 to the other end of shaft 10. Provision is made for the vertical movement of the bearing 11 by supporting the latter on vertically supported bolts 11ᵃ. Springs 11ᵇ are adapted to force the bearing 11 to the position in which the pinion 12 rests on the ring-gear 13. The upper ends of the bolts 11ᵃ are supported on a transverse beam 2ᵇ which is secured at its outer end to the runways 2 and 2ᵃ. In the event of a tilting movement of the turntable causing the transverse member 2ᵃ to be lowered or raised, the springs 11ᵇ will allow for a corresponding movement of the bearing 11 so that the pinion 12 remains in mesh with the ring-gear 13. The ring-gear 13 is preferably supported on channel members 1ᵈ which are secured to the bottom of the base member 1ᵃ, there being thus provided a rigid connection between the latter and the ring-gear 13.

The drums 3 and 3ᵃ and 4 and 4ᵃ are provided with sprockets 14 and 14ᵃ and suitable chains 15 and 15ᵃ, thus providing a chain drive between the drums 3 and 4 and 3ᵃ and 4ᵃ, respectively. As shown in Fig. 9, the purpose of the chain drive is to enable the traction exerted by the wheels positioned on the traction drums 4 and 4ᵃ and the idler drums 5 and 5ᵃ to be transmitted to the transmission mechanism enclosed in the housing 7. In the case of a truck having a very long wheel base being accommodated on the turntable, the traction wheels will be positioned on the drums 4, 5, 4ᵃ and 5ᵃ and the tractive effort developed is then transmitted through the chain drive to drum shafts 7ᵃ and 7ᵇ. In the case of a truck or automobile having an exceptionally small wheel base the traction wheels are positioned preferably on the drums 3, 6, 3ᵃ and 6ᵃ, respectively. The purpose of the various positions available for supporting the driving wheels is to enable vehicles of various lengths to be balanced as equally as possible on either side of the turntable pivot. I thus provide for trucks of short, intermediate and great length of wheel base. As will be noted in Fig. 1, the drums 3, 4, 5 and 6 occupy the outer half of the end portion of the runway 2, while the drums 3ᵃ, 4ᵃ, 5ᵃ and 6ᵃ occupy the inner half of the outer portion of the runway 2ᵃ. At opposite ends of the runways 2 and 2ᵃ the position of the drums is reversed. The purpose of this arrangement is to enable the front wheels to be accommodated to one side of the drums as it is obvious that they will not otherwise be properly supported. The drums of each individual group are spaced apart sufficiently to allow a traction wheel to drop down between the rollers in order to prevent them from riding out of them due to the tractive effort exerted by the wheels when turning the table, in case the latter offers considerable resistance.

The drums 3, 4, 3ᵃ and 4ᵃ are provided with ratchets 17, having preferably widely separated teeth and may form an integral part of the respective drums, as shown best in Fig. 6. Cooperatively mounted with each ratchet, I provide a pair of pawls 18 and 19 pivotally mounted on either side of the respective ratchets in such a manner that when one of the pawls is brought into engagement with the teeth 14ᵃ, the drum is free to rotate in one direction only but is prevented from rotating in the opposite direction. While when the other pawl is brought into engagement with the teeth the conditions are reversed. The pawls are set so that all of the drums will rotate in one direction, the opposite direction of rotation of any of the traction drums thus being prevented. This direction of rotation corresponds to the direction in which the drums tend to rotate when the vehicle wheels pass over them at the time the vehicle is driven on to the turntable. When the vehicle has been driven on to the turntable and is supported on one or the other pairs of traction drums, the vehicle transmission gears are reversed so that the direction of rotation of the driving wheels is reverse when the clutch in the vehicle is engaged. This causes the drums to be rotated in the direction in which the engaging pawl will slip over the ratchet teeth and the turntable is thus rotated by means of the pinion 12 rotating on the ring-gear 13. In leaving the turntable, the vehicle is driven in the original direction thus passing off at the opposite end of the turntable.

At the outer ends of the runways I provide rollers 20 which are adapted to run on an annular track 21, preferably made of reinforced concrete. The rollers 20 do not normally carry any appreciable weight, their purpose being merely to prevent the outer ends of the runways from scraping against the sides of the pit in which the turntable is mounted when the loads carried by the turntable is not evenly distributed causing the turntable to tilt slightly.

In Figs. 7 and 8 I show a modified form of my turntable. The base 1 and runway 2 are essentially the same as those described in the preferred form. Each end of the runways 2 and 2ª are provided with four traction drums as illustrated in Fig. 8. The transmission mechanism however, is arranged for driving the pinion 12 in mesh with a ring-gear 22 which is of a large diameter occupying a position at the periphery of the pit in which the turntable is mounted. In order to effect this arrangement it is merely necessary to reverse the position of the transmission mechanism 7, the shaft 10 extending outwardly instead of inwardly in the case of the preferred arrangement. The ring-gear 22 is preferably secured to a concrete foundation 23 which also supports the annular track 24, which may be an integral part of the ring-gear 23. The rollers 20 which are secured to the outer ends of the runways 2 and 2ª, are adapted to run on the track 24. As in the case of the preferred form, the runways in my modified form are provided at both ends with the group of drums so that the turntable can be operated from either end. The rollers at the opposite ends of each runway are offset in opposite directions from the center line of the runway so that the front wheels may be accommodated on a flat surface whichever way the vehicle is facing. It is of course to be understood that the runways are made practically of double width in both forms of my turntable for this purpose.

It is obvious from the construction as illustrated in the drawings and described in the foregoing specification that there is provided a vehicle propelled turntable as aimed at and set forth in the objects of the invention, and though I have shown and described a particular construction, combination and arrangement of parts and portions and a modification thereof, I do not wish to be limited to this particular construction, combination and arrangement and modification but desire to include in the scope of my invention the construction, combination and arrangement substantially as set forth in the appended claims.

Having thus described my invention, what I claim as new and desire to secure by Letters Patent is:

1. In a device of the class described, a pair of revolubly supported runways, a plurality of pairs of spaced apart revolubly mounted drums at each end of said runways, adjacent drums on each runway adapted to support driving wheels of a vehicle, power transmitting mechanism associated with one drum of each pair adapted to cause rotation of said runways when said vehicle driving wheels are rotated, enabling said driving wheels to occupy various driving positions on said runways and facilitating the balancing of the vehicle thereon.

2. In a device of the class described, a pair of relatively broad runways revolubly supported on a central bearing, a pair of revolubly mounted spaced apart drums positioned at the outer side of the outer end portion of one of said runways, a second pair of drums positioned on the inner side of the outer end portion of said other runway, other pairs of drums positioned in the reverse order at the other end of said runways, power transmitting means including a driving pinion associated with each pair of drums adapted to cooperate with a centrally positioned stationary ring-gear whereby said runways are caused to rotate by the rotation of the driving wheels of a vehicle supported on the drums at the one end of said runways while the front wheels of said vehicle are supported to one side of the drums at the other end of said runways.

3. A pair of relatively broad runways revoluble around a central bearing, pairs of drums mounted at the outer ends of said runways, the pairs of drums at the one end being positioned on one side of the runways, the pairs at the opposite ends being positioned on the other side thereof, whereby the rear wheels of a vehicle are adapted to be supported on the drums at one end while the front wheels are supported to one side of the drums at the other end, power transmitting mechanism for causing said runways to revolve around said central bearing when said drums are driven by the driving wheels in one direction, and means for preventing said drums from rotating in the opposite direction for enabling the vehicle to pass over the drums.

4. In a turntable, a central bearing, a pair of runways mounted thereon, a plurality of spaced apart drums revolubly mounted at one end of said runways, oppositely disposed drums of each runway being revoluble around a common transverse axis, means for transmitting power from one pair of oppositely disposed drums to a driving mechanism adapted to cause rotation of said turntable, power transmitting means connecting adjacent drums to said first mentioned pair, other independently revoluble drums positioned on either side of said adjacent connected drums, whereby the power from the rear wheels of a vehicle supported on any two adjacent drums may be transmitted to said driving mechanism.

5. In a turntable, a revoluble platform supported on a central bearing, pairs of drums mounted at one end thereof adapted to support the driving wheels of a vehicle, power transmitting mechanism connecting certain of said drums to a centrally positioned shaft, a relatively flexibly mounted bearing revolubly supporting said shaft on said platform, a pinion on said shaft, and a stationary ring gear concentric with said central bearing, said pinion adapted to engage said ring gear and cause rotation of said platform on rotation of said drums.

6. In a turntable, a revoluble platform supported on a central bearing, said platform forming two sets of parallel disposed runways, one for each direction of approach, groups of revolubly mounted spaced apart drums positioned at one end of one set of runways, other groups positioned at the opposite end of the other set of runways, said drums adapted to support the driving wheels only of a vehicle, means for transmitting power from any pair of drums on which the driving wheels are supported to a driving mechanism for causing rotation of said platform and ratchet means associated with each drum whereby the rotation thereof in a predetermined direction may take place for causing rotation of the platform and may be prevented for permitting a vehicle to pass over the drums.

In testimony whereof, I have hereunto set my hand at San Diego, California, this 5th day of April, 1928.

GUY S. EXON.